INSULATION STRIP WEB WITH MULTIPLE OVERLAPPING STRIPS
Filed Sept. 23, 1963 2 Sheets-Sheet 1
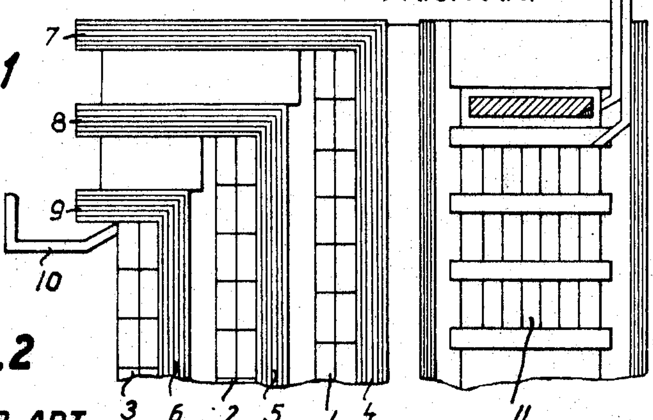
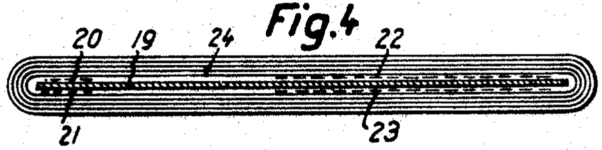
Fig. 4
20 19 24 22
21 23
Fig. 3
16
15 17 18
Fig. 5
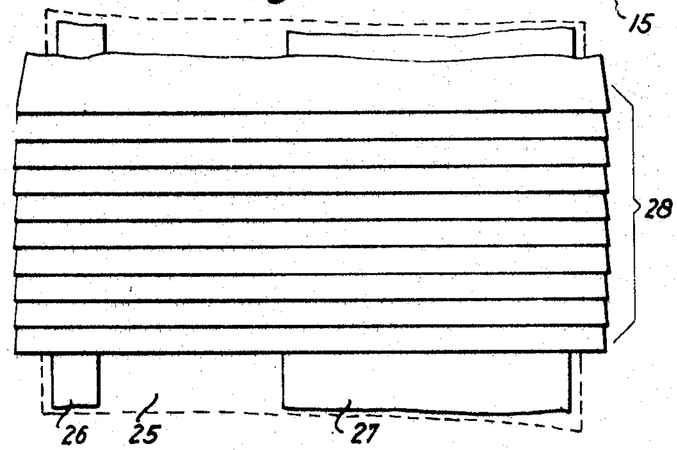
Fig. 11
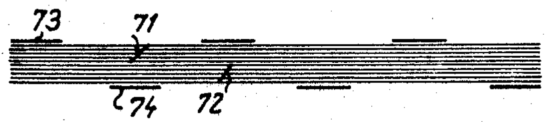
Fig. 10
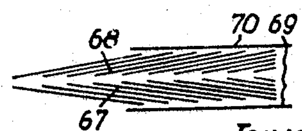
Inventor:
Willy Rabus
By: Spencer & Kaye
ATTORNEYS INSULATION STRIP WEB WITH MULTIPLE OVERLAPPING STRIPS
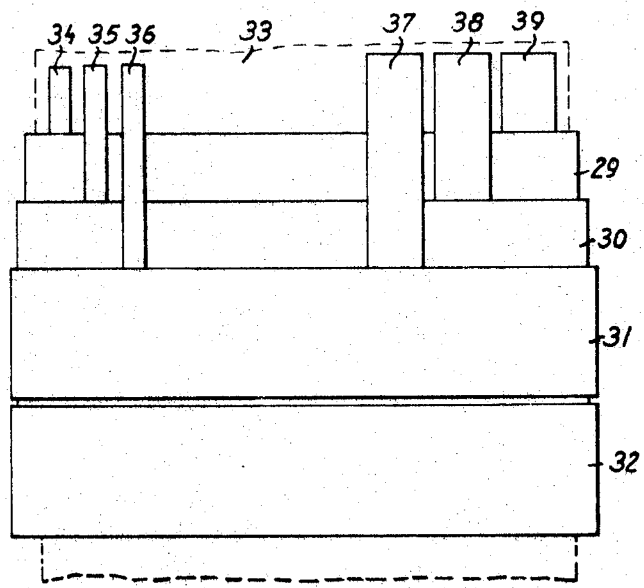
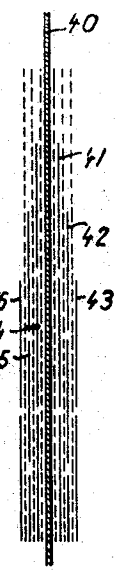
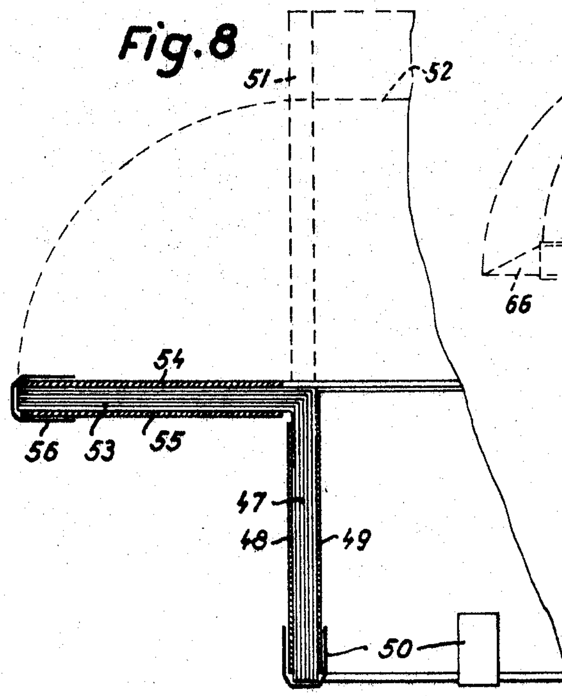
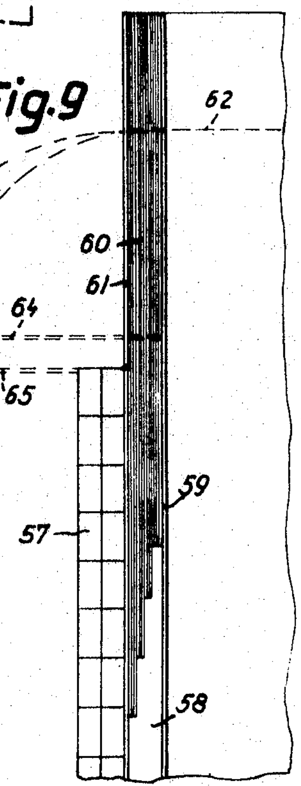
Inventor:
Willy Rabus
By: Spencer & Kaye
ATTORNEYS United States Patent Office 3,392,229

Patented July 9, 1968

3,392,229

INSULATION STRIP WEB WITH MULTIPLE OVERLAPPING STRIPS

Willy Rabus, Stuttgart-Unterturkheim, Germany, assignor to Licentia Patent-Verwaltungs-G.m.b.H., Frankfurt am Main, Germany Filed Sept. 23, 1963, Ser. No. 310,565
Claims priority, application Germany, Sept. 24, 1962, L 43,037
18 Claims. (Cl. 174—138)

ABSTRACT OF THE DISCLOSURE

A strip web for producing spatially deformed insulation is made from a plurality of strips of solid insulating material, the strips being positioned transversely to the length of the web in multiple overlapping relation with each other and being held in position by longitudinal band means attached thereto.

High-voltage apparatus and machinery are often equipped with insulation consisting of thin layers of wound-on insulating material which, after being wound onto the machinery and after a flange portion has been left which extends beyond an edge and which is to be divided into strips, is forcibly bent over so as spatially to deform the insulation, thereby to provide a boundary field insulation.

One example of such spatially deformed insulation is the angled-over flange of the laminated insulation of oil-filled high-voltage transformers provided with laminated windings, as shown in FIGURE 1, in which the laminated or multiple-layer high voltage windings 1, 2, 3, are provided with laminated or multiple-layer insulation 4, 5, 6. The insulating flanges 7, 8, 9, which are bent over at right angles, were, prior to being so bent over, overlying or projecting flanges of the insulation 4, 5, 6. The lead-out of the high-voltage winding is shown at 10, while the low-voltage winding is shown at 11.

It is true that very good boundary field insulation is obtained by means of bending over the insulating laminations, but such insulation is very expensive. Accordingly, various efforts have been made to reduce the costs of this type of insulation, and according to one proposal, the web of insulating material from which the laminated insulation is made—usually thin cable paper or tape—is, before the laminated insulation is formed, at its end and by suitable machine processes, sub-divided into strips, i.e., "feathered." If this feathering is done so that the strips are of the same size, then there is the danger, particularly in the case of thicker laminations, that, due to the constantly changing diameter of the wound insulation, a plurality of cuts in the strips come into overlapping, i.e., aligned, relationship, thereby substantially reducing the insulation afforded by the laminations. If, on the other hand, the strips are—as they really should be—so feathered that the width of each strip is adapted to the diameter of the particular work piece onto which they are wound (this would mean that the width of the strips would have to correspond to a constant pitch angle independent of the diameter of the work piece being wound), expensive winding machinery, such as a rigid coupling between the work piece and feathering machine, would have to be provided and this, in turn, would render the insulation just as expensive, if not more so, than the first-described solution.

If the insulated web is feathered as shown in FIGURE 2, in which the inner, thick insulation web 12 is covered by two outer feathered webs 13 and 14 which are staggered with respect to the center web, the center web being twice as thick as the outer ones, one or several laminations will not cause cuts of adjacent webs to overlap each other, thereby preserving the maximum insulation effect. But if the over-all insulation comprises more than a few turns, there is again the danger that cuts will come into alignment with each other inasmuch as the outer web will always have a larger, if but slightly larger, speed while being wound on the work piece, so that the cuts of the individual webs will constantly shift with respect to each other.

It is, therefore, an object of the present invention to overcome the above drawbacks, namely, to provide spatially deformed insulation which avoids the disadvantages of the above-described laminations. Accordingly, the present invention resides in a strip web for producing spatially deformed insulation made of thin layers of rigid insulating material, particularly boundary field insulation for high-voltage apparatus and machinery, which insulation is so constructed that transverse insulating strips are applied in multiple overlapping relationship onto a longitudinal band at approximately right angles to the edges thereof, which strips are connected to each other.

Additional objects and advantages of the present invention will become apparent upon consideration of the following description when taken in conjunction with the accompanying drawings in which:

FIGURES 1 and 2 already referred to above, show the prior art.

FIGURE 3 is a section of a web according to the present invention.

FIGURE 4 is a sectional view of another embodiment of a web according to the present invention.

FIGURE 5 is a top view of the web of FIGURE 4.

FIGURE 6 is another embodiment of a web according to the present invention.

FIGURE 7 is a longitudinal sectional view of the web of FIGURE 6.

FIGURE 8 is a sectional view showing the insulation obtained by a web according to the present invention.

FIGURE 9 is a sectional view showing another embodiment of the insulation obtained by a web according to the present invention.

FIGURE 10 shows a double strip web according to the present invention.

FIGURE 11 is a longitudinal sectional view of the double strip web of FIGURE 10.

Referring now to the drawings and to FIGURE 3 thereof in particular, the same shows two longitudinal insulation bands 15, 16, illustrated in dashed lines. These bands 15 and 16 carry transverse strips 17 which, in a scale-like manner, overlap themselves by several layers, i.e., the strips 17 are in multiple overlapping relationship. Also shown is a support band 18.

In the embodiment of FIGURE 4, the insulation comprises the support band 19, two narrow longitudinal bands 20 and 21, two wide longitudinal bands 22 and 23, and the scale-like transverse strip 24 which is wound about the support and longitudinal bands and whose turns overlap each other by several layers. It is specifically pointed out that in the embodiment of FIGURE 4, as well as in that of FIGURE 3 described above and in the embodiment of FIGURE 5 to be described below, the cross-over and transposition of the individual transverse strips which will result when a transverse strip is wound onto the longitudinal and/or carrier bands, are not illustrated. The transverse strips shown in section in FIGURE 4 are, in reality, not continuous loops but open turns. This factor, however, is not of major importance insofar as the present invention is concerned.

In the embodiment of FIGURE 5, the web comprises a carrier band 25, a narrow longitudinal band 26 and a wide longitudinal band 27, and the transverse strips 28.

The embodiment of FIGURE 6 differs from that of FIGURE 5 in that the transverse strips 29, 30, 31, 32, do not overlap in a scale-like manner, i.e., instead of being sloped, the individual transverse strips are arranged in level layers, with the strips within the same layer being spaced slightly apart. The carrier band is shown at 33, the narrow longitudinal band between the individual layers at 34, 35, 36, and the wide longitudinal bands of the respective layers at 37, 38, 39.

FIGURE 7 shows the carrier band 40, on each side of which there are three layers of transverse strips 41, 42, 43, 44, 45, 46. The longitudinal bands are, for the sake of clarity, shown in dashed lines.

For further processing, the web of FIGURES 5 and 6 will generally be divided into two webs by cutting along the longitudinal edges of the carrier band. Each web can then be processed further by itself.

If the width of the transverse strip of the web is $b$, if $n$ is the smallest number of overlapping transverse strips per web, the breakdown path $s$ along the strips for a web according to FIGURES 3, 4 and 5 is $$s=b(1-1/n)$$

If the insulation is constituted by a total of Z webs, the total breakdown path $s_t=Z\cdot s$. If but one web is ued, care must be taken that the junction of the ends of the web is properly overlapped. This is actually quite simple with a web according to the present invention. If $n$ is made equal to 5 (i.e., if at any point along the web there are five overlapping transverse strips), the width of (0.2) ($b$) remaining for the adhering can easily be handled and is adequate to secure a good insulation.

For a web according to FIGURES 6 and 7, the breakdown path $s$ along the strip is $$s=(b/2)(n-1)$$

and if there are a total of Z webs, the total breakdown path $s_t=Z\cdot s$. This assumes the most unfavorable case where the cuts of two overlapping webs come into alignment with each other. Here, too, a reliable overlapping can readily be obtained at the junction even if there is but one web.

It is also pointed out that in that portion of the final insulation which is constituted by the deformed strips of the strip web, there are no longitudinal bands. This results in a certain loss in active insulating material. The same can, however, be kept within tolerable limits if a sufficiently large number of transvere strips are provided on each web. If it is again asumed that there are five overlapping transvere strips and if the longitudinal bands are made exactly as thick as the transverse strips, the loss will be only approximately 17%. But even this loss can be compensated for by making the strip web of insulating strips which are substantially thinner than the strips made by the heretofore conventional bending process. This is possible because the thickness of the insulating strips is, in a mechanical process, of far less significance than in the case of a manual bending process.

The purpose of dividing the longitudinal band into a wide band and a small band with a free strip length therebetween is to make possible a further processing of the webs without there being any free fluttering strip ends. produced possibly during the winding of the strip onto a work piece, the wide longitudinal band being the one which takes up the bulk of the tension of the winding. If, after the winding operation, the narrow carrier band together with the strip components glued thereto, are cut off, the free stripping is produced, without appreciable loss of material, between the two bands and is available for further deformation.

The mechanical connection between the longitudinal and transverse strips is generally effected by adhesives, or, in the case of plastics, be welding, although in many cases the frictional forces between the longitudinal bands and transverse strips will, basically, provide sufficient mechanical interconnection.

If the strip webs are provided for transformers, e.g., oil-filled high-voltage transformers, the insulation of which the strips are made will preferably be high grade insulating paper and the adhesive joining the same will be starch gum.

The carrier strip shown in FIGURES 3, 4, 5, 6, and 7 makes it possible to wind the transverse strips continuously onto the carrier and longitudinal bands which are likewise supplied continuously. This makes it very easy to manufacture the strip web according to the present invention, particularly if the adhering and/or welding is also carried out continuously.

Strip webbing is often used to form insulating cylinders, particularly for high-voltage transformers and measuring transformers, in which case the ends of the transverse strips are, in order to provide a boundary field insulation, deformed with respect to the cylindrical part. After such deformation, the transverse strips are cemented or glued, and can be subjected to further working steps under heat and pressure.

The strip webs according to the present invention can also be used to form so-called angle rings constituting independent insulated shaped parts. Such a ring is shown in FIGURE 8, and comprises a cylindrical web 47 which is held by two collars 48 and 49 made of insulating material, e.g., press board, as well as by an approximately U-shaped insulating strip 50 which is glued on. When the length of strip webbing 51 is originally manufactured, a cut is made along the cutting line 52, and the thus freed strips are bent over at right angles so as to form the outer flange 53. This outer flange is then fixed by means of annular discs 54 and 55 made of insulating material as well as by an adhesive strip 56.

Rings having outer projections as well as rings having an inwardly directed flange can be similarly made.

FIGURE 9 shows how the strip web can be used to particular advantage for making insulating flanges when windings having substantial axial lengths are to be provided with insulation. The winding is shown at 57, and the longitudinally stepped laminated insulation, generally made of cable or tape paper, at 58. Below the laminated insulation is a thin press board cylinder 59, onto which the layers of insulation 58 are applied as tightly as possible. More particularly, the strip 60 is applied in several layers, whereafter a final insulating layer 61 is applied over the strip 60. The winding 57 is then applied over the thus-prepared insulation. Those portions of the strip web which project beyond the end are cut along a fine line 62 and then bent over at right angles to form the flange 63. A support 64 for the flange 63 is provided by the bending over of the press board cylinder 59 which was previously cut at its edges. This support can be reinforced by means of a ring 65 made of insulating material. The excess of the bent over transverse strip, shown at 66, is then cut off.

A particularly good guide may be obtained for the strip web of FIGURE 9 if bent over strips are provided between the strip webs of the insulating flange, which bent over strips are made of the basic insulating material. These additional bent over flanges will be provided at those places where very high electrical stresses occur; in the embodiment of FIGURE 9, this will be directly at the winding 57.

In some cases, for example in the case where soft paper barriers with oil paths are electrically connected in series, these barriers being deformed at the ends, it may already suffice if one projecting layer of one strip web is provided between two short layers of the basic insulation and if then only this one projection layer is deformed.

According to another feature of the present invention, applicable particularly in the case of scale-like overlapping strips, the strip web is arranged in the form of a double strip web. This is shown in FIGURE 10 in which the insulating transverse strip layers are shown at 67 and 68, the longitudinal bands being shown at 69 and 70. In order to provide better high-voltage insulation, the scales of such a double strip web will be arranged to slope in opposite directions.

In FIGURE 11, which is a longitudinal section of the double strip web of FIGURE 10, the transverse strip layers are shown at 71 and 72, the upper longitudinal band at 73, and the lower longitudinal bands at 74. In order to keep the loss of active insulating material, which is inherent in such strips, to a minimum, the longitudinal bands will, in the case of the double strip web, be staggered with respect to each other.

The arrangement can be modified so that the longitudinal bands are arranged in the middle between two layers of the transverse strip.

The transverse strips may be secured to the longitudinal strips by detachable adhesive tacking, so that after the strip web has been applied to the work pieces, the lonigtudinal bands which will free the strips can be removed simply by pulling them off. This feature can be used in conjunction with most strip webs.

It will be understood that the above description of the present invention is susceptible to various changes, modifications and adaptations, and the same are intended to be comprehended within the meaning and range of equivalents of the appended claims.

What is claimed is:

1. A strip web for producing spatially deformed insulation made of thin layers of solid insulating material, said web comprising a series of multiple overlapping strips arranged transversely to the length of the web and longitudinal band means for holding said transverse strips in position, said transverse strips being arranged in a plurality of different layers with the transverse strips within each layer being spaced from each other but the interspaces of immediately adjacent layers being staggered with respect to each other so as to be out of alignment with each other.

2. A strip web as defined in claim 1 wherein said longitudinal band means include a plurality of individual longitudinal bands.

3. A strip web as defined in claim 1 wherein each layer of transverse strips is provided with at least one longitudinal band.

4. A strip web as defined in claim 1 wherein said strips and band means are made of insulating paper.

5. A strip web as defined in claim 1 wherein said strips and band means are secured to each other by adhesive.

6. A strip web as defined in claim 5 wherein said adhesive is starch gum.

7. A strip web as defined in claim 5 wherein said strips and band means are self-adhering.

8. A strip web as defined in claim 1 wherein said strips and band means are made of plastic.

9. A strip web as defined in claim 8 wherein said strips and band means are secured to each other by welding.

10. A strip web as defined in claim 1, further comprising a longitudinal carrier band for supporting said longitudinal band means and transverse strips.

11. A strip web as defined in claim 1 wherein said transverse strips are constituted by turns of a strip which is continuously wound onto said longitudinal band means.

12. Cylindrical insulation comprising a strip web as defined in claim 1, a portion of said transverse strips being flanged over with respect to the main portion of said strip web to provide boundary field insulation.

13. Insulation comprising a strip web as defined in claim 1, said strip web being cemented to a workpiece subsequent to final spatial deformation.

14. An insulating ring having an angled cross section comprising a strip web as defined in claim 1, said strip web being wound in the form of a ring and being spatially deformed to have an angled cross section.

15. Insulation comprising a main insulation and a boundary field insulation, the latter comprising a strip web as defined in claim 1, said main insulation and boundary field insulation being attached to a workpiece, and said boundary field insulation smoothly abutting said main insulation.

16. A double strip web having two web portions each as defined in claim 1, said two web portions being positioned adjacent to each other.

17. A double strip web as defined in claim 16 wherein the longitudinal band means of each web portion are staggered with respect to each other.

18. A strip web as defined in claim 1 wherein said longitudinal band means are secured to said transverse strips by detachable adhesive tacking.

References Cited

UNITED STATES PATENTS

| | | | |
|---|---|---|---|
| 934,311 | 9/1909 | Hoberg | 281—21 X |
| 1,239,329 | 9/1917 | Wilks | 161—145 X |
| 1,875,382 | 9/1932 | Hutchens | 129—16 |
| 2,057,647 | 10/1936 | Karfiol | 161—145 |

FOREIGN PATENTS

| | | |
|---|---|---|
| 902,612 | 1/1954 | Germany. |
| 61,072 | 7/1939 | Norway. |
| 563,186 | 12/1957 | Belgium. |
| 910,806 | 5/1954 | Germany. |
| 78,664 | 6/1951 | Norway. |

LARAMIE E. ASKIN, *Primary Examiner.*